May 25, 1965
J. R. SMIRRA
3,185,438
CONE LABYRINTH VALVE
Filed Aug. 17, 1962
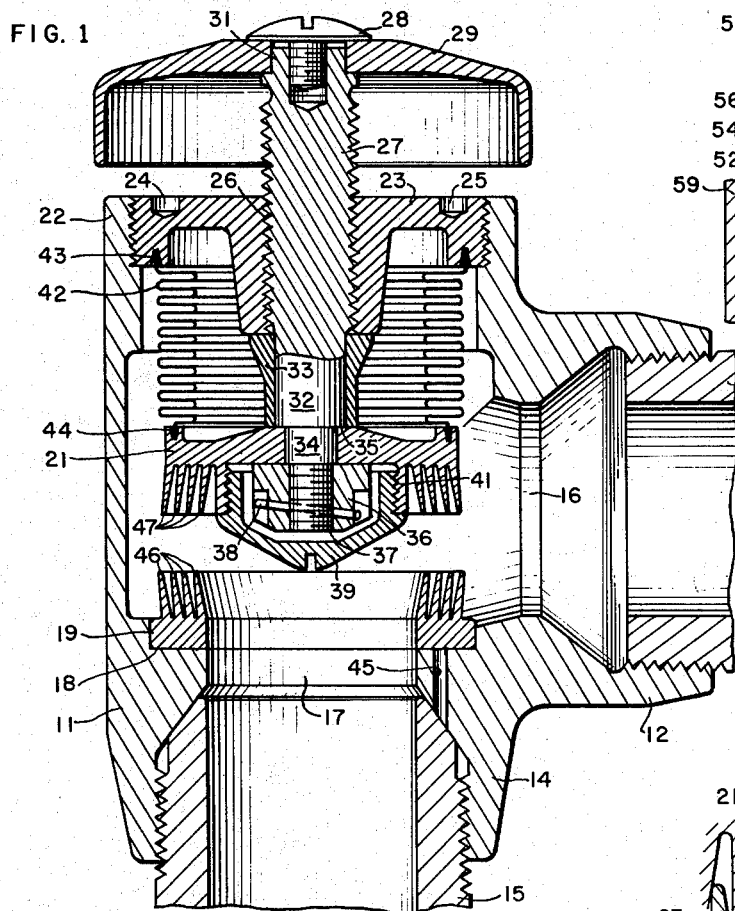
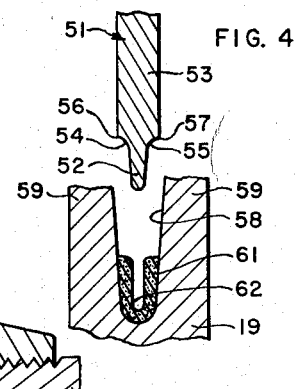
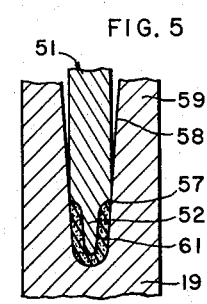
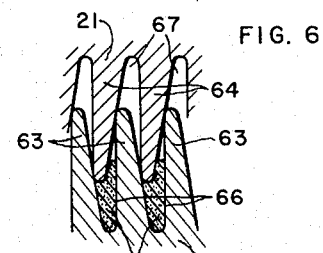
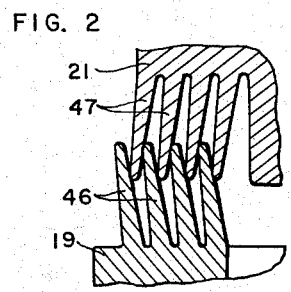
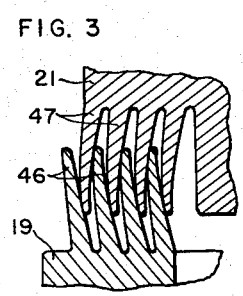
*INVENTOR.*
JOHANNES R. SMIRRA
BY
E. Hayward Marshall
AGENT

3,185,438
CONE LABYRINTH VALVE
Johannes R. Smirra, 13054 Morningside Way,
Los Angeles, Calif.
Filed Aug. 17, 1962, Ser. No. 217,704
5 Claims. (Cl. 251—334)

This invention relates to a fluid flow control device and more particularly to a cone labyrinth valve which accomplishes a tight closure by combining the labyrinth throttling effect with resilient, sliding contact sealing between a plurality of concentric, thin, resilient, conical elements on both the valve disk and the valve seat.

Many different types of valves have been constructed with various types of seals between the stationary and the movable closure elements, which are usually termed the valve disk and valve seat. When these contacting surfaces were made of metal, a slight degree of misalignment could cause leakage, and any dirt or foreign matter between the valve disk and the valve seat would cause abrasion or scratching, which would also cause leakage. Other types of valves utilized a resilient, relatively soft plastic, rubber or soft metal on the valve seat in order to insure effective seating but in this type of construction any dirt or foreign matter might become embedded, and eventually ruin the valve seat, or again may cause leakage due to faulty seating.

Briefly stated, one preferred embodiment of the cone labyrinth valve of the present invention consists essentially of a conventional valve body with a threaded stem and hand wheel for operation thereof and movement of the valve disk toward and away from the valve seat. The improved valve disk and valve seat of the present invention consist of a plurality of concentric thin frusto-conical annular rings or circular knife blades which are flared outwardly and inter-spaced, so that the edges of one set of circular blades, for example, on the valve disk extend between and engage the inner walls of the blades on the valve seat to form a labyrinthian passage for the fluid even before a circular line contact is made, so that a gradual throttling effect is provided before a complete seal is effected. These annular rings are preferably very thin and tapered toward their outer edges so that they are resilient and flexible to compensate for any slight misalignment between the valve disk and the valve seat, and will thus provide a perfect seal at all points around each of the rings when they are forced into tight engagement with each other.

In one preferred modification of this invention a relatively soft metal or plastic may be provided in the bottom of each of the grooves formed by the annular rings and a relatively narrow tip portion is formed on each of the rings which embeds itself in the soft material to provide an even tighter seal, particularly with fluids such as gas which tend to leak very easily past a conventional valve seat. These relatively narrow outer edge portions on each of the blades may be so formed as to provide a scraping edge on opposite sides, which also form a part of the seal and will tend to scrape away impurities on the side walls of the groove.

One object of the present invention is to provide a cone labyrinth valve which provides a superior sealing effect for flow control of all type fluids such as gases, liquids and slurries.

Another object of the present invention is to provide an improved all metal valve construction utilizing multiple flexible sealing surfaces which continually clean and lap each other, and which may be utilized at extremely high or low temperatures and at extremely high pressures, even with such exotic fluids as liquid metals which are utilized in nuclear reactor techniques.

Other objects and many of the attendant advantages of this invention will be readily apreciated, as the same becomes better understood by reference to the following detailed description, when considered in connection with the accomapnying drawings wherein:

FIGURE 1 is a cross sectional view taken through one preferred embodiment of the present invention and illustrating the preferred form of multiple cone labyrinth sealing edges on the valve disk and valve seat;

FIGURE 2 is an enlarged detailed fragmentary view schematically illustrating the initial engagement of the conical metal blades of FIGURE 1;

FIGURE 3 is a fragmentary sectional view similar to FIGURE 2 but showing the blades slightly bent due to their resilience and elasticity, after they have been forced into tight engagement by movement toward each other beyond the point illustrated in FIGURE 2;

FIGURE 4 is a fragmentary detailed view in cross section, and illustrating one modification of the blade of the present invention with the valve in open position;

FIGURE 5 is a cross sectional view similar to FIGURE 4 but showing the blade engaged in the groove of the valve seat and with the thin tip edge seated in the soft material in the bottom of the groove; and FIGURE 6 is a fragmentary sectional view similar to FIGURE 3, but illustrating another modification of the present invention and showing the thin blades of the disk seated in a soft material in the grooves on the seat.

Referring now to the drawings in detail and more particularly to FIGURE 1, a conventional valve body 11 is provided with an internally threaded inlet opening or sleeve 12 which is adapted to receive the threaded end of a conduit 13. An outlet opening or sleeve 14 is also threaded internally to receive the threaded end of an outlet conduit or pipe 15.

The inlet port is defined by the annular surface 16, and the outlet port is defined by the annular surface 17, which is adjacent an annular groove 18 adapted to receive the novel valve seat 19 of the present invention. Valve seat 19 will be described in more detail subsequently in conjunction with the complementary valve disk 21, as shown in FIGURES 2 and 3.

The rest of the valve structure is a conventional construction and includes the internally threaded opening to receive the valve bonnet 23, which is provided with a plurality of openings 24 and 25 adapted to be engaged by the prongs on a spanner wrench (not shown) for tightening the valve bonnet 23 in the valve body 11.

The valve bonnet 23 is provided with a central threaded opening 26 adapted to receive the valve stem 27.

The upper end of the valve stem 27 is provided with a threaded opening which receives the machine screw 28 for holding the hand wheel 29 in position on the square end portion 31.

The lower end of the valve stem 27 has a reduced diameter cylindrical portion 32 which rotatably receives a collar 33 which fits rather loosely therearound. Another reduced diameter portion 34 forms a shoulder 35 which engages the valve disk 21. Valve disk 21 is held in position, as shown, by a nut 36 threaded on the lower end of the valve stem 27 and held in position by the pin 38 extending transversely through the nut 36 and the threaded portion 37.

A cap 39 may be screwed into the threaded opening 41 in the lower portion of the valve disk 21, which receives the nut 36. Cap 39 is adapted to provide a fluid tight seal to prevent leakage through the valve stem and may be sweated in or sealed with a suitable sealing compound.

In order to further provide a fluid tight seal around the outside of the valve stem 27, a bellows 42 may be provided, which would also be sweated into the annular grooves 43 and 44 in the bonnet 23 and valve disk 21 respectively. This arrangement provides for free rotational movement of the valve stem 27 by the hand wheel 29 moving the valve disk 21 towards and away from valve seat 19 with a minimum of effort, but without any possibility of leakage through the bonnet 23 and valve stem 27.

The valve seat 19 is securely held in position in the annular groove 18 by contracting at a cold temperature, for example, by immersion in Dry Ice, and inserting it in the relatively warm valve body 11, or alternatively by heating up the valve body 11 and inserting the relatively cold valve seat 19 into the annular groove 18. After the valve seat 19 is worn, it may be removed for replacement by means of one or more pins driven through holes, such as the one shown at 45 in FIGURE 1.

The valve seat 19 is provided with a plurality of concentric, annular, knife blades or rings 46 which are preferably frusto-conical in their general configuration and taper outwardly to a relatively sharp knife edge. While the valve seat 19 is preferably integrally formed with the plurality of annular rings and made out of metal, such as stainless steel, which is resistant to most corrosive liquids, gases or other fluids, these rings are sufficiently thin and flexible, so that they will bend sufficiently to conform to the complementary annular rings 47 on the valve disk 21, as they are forced into engagement in the manner illustrated in FIGURES 2 and 3.

However, these annular rings 46 and 47 may also be individually formed out of thin metal and inserted in suitable grooves (not shown) in the valve seat 19 and valve disk 21. In other applications, where the long life and temperature resistance of a metal, such as stainless steel is not required, it will be apparent that the valve seat 19 and valve disk 21 may be integrally formed from plastic materials such as nylon, neoprene, Bakelite or any suitable thermosetting resin.

The fragmentary detail views in cross section of FIGURES 2 and 3 illustrate one preferred design in accordance with the present invention, wherein the annular rings 46 on the valve seat 19 and the complementary rings 47 on the valve disk 21 are formed of some suitable metal, such as stainless steel, and are tapered outwardly at an angle of approximately 7° with respect to the axis of the valve stem 27. In one preferred embodiment the outer surface of the blades 46 and 47 would be at an angle of approximately 4° with respect to the axis, and the internal surface of the blades would be at an angle of about 10° with respect to the axis. However, these angles can be made larger or smaller, as desired, depending upon the particular application and design of the valve. When the angle is relatively small with respect to the axis, a softer action is obtained, but a longer travel of the valve stem is required between the first contact and the tightest sealing contact between the blades 46 and 47. With a larger angle it provides a harder faster action with a short travel of the valve stem 27 between the positions shown in FIGURES 2 and 3. As clearly shown in FIGURE 3, but slightly exaggerated, the outer ends of the blades 46 and 47 will deflect or bend slightly, after the tip ends have engaged, as shown in FIGURE 2, to the slightly curved or angled position, as illustrated in the exaggerated view of FIGURE 3. While the blades have been shown with the outer tip edges of the blades 46 and 47 contacting simultaneously, it will be apparent that the blades 47, for example, could contact the inside surface of the annular blades 46 before the outer tip edges of the blades 46 contacted the inner conical surfaces of the blades 47. In either case it will be obvious that as the blades slide and bend in contact with the complementary blades that there will be a scraping action which will remove any dirt or other foreign material on the mating surfaces and there will be a self lapping action as the valve disk 21 engages the valve seat 19.

The modification of the present invention illustrated in the enlarged fragmentary views of FIGURES 4 and 5 may be formed as a single ring on the valve seat 19 or the valve disk 21 to engage in a single groove in the complementary member, or may be formed as a plurality of rings similar to those shown in FIGURES 1, 2, and 3.

The ring 51 may be formed sufficiently thin so that it is flexible in the same manner as the annular rings 46 and 47, or may be made relatively rigid. The outer tip edge portion 52 is made thinner than the body portion 53 and is preferably formed by the curved annular recesses 54 and 55 to provide the sharp scraping edges 56 and 57. A groove 58 is formed in between the inter-spaced rings 59 on a complementary member, such as the valve seat 19, and is provided with a soft metal or plastic, or other pliable material 61 in the bottom of the groove 58, which may be shaped with a slot 62 complementary to the narrow tip edge 52, or the material may be soft enough to be self conforming, when the blade 51 with edge 52 is forced into the material 61.

With this particular construction one of the scraping edges 56 and 57 may engage the side wall of the groove 58 before the opposite side, or both sides may engage simultaneously. This provides a double seal with the edges 56 and 57 engaging the sides of rings 59 and the tip edge 52 imbedded in the soft material 61.

If desired the particular conformation shown in FIGURES 4 and 5 may readily be provided by a plurality of concentric annular rings 51 and 59, similar to the rings 46 and 47 in FIGURES 2 and 3, and the rings could have cylindrical or conical surfaces which may be at a large or small angle with respect to the axis of the valve body 11 and valve stem 27, or may be substantially parallel thereto, as desired.

The other modification of FIGURE 6 is similar to that shown in FIGURES 1, 2, and 3, and has a plurality of concentric annular rings 63 on the valve seat 19, and a plurality of inter-spaced annular rings 64 on the valve disk 21.

This form of the invention also utilizes a soft metal or plastic material 65 in the bottom of the grooves 66 between adjacent rings 63 on the valve seat 19. Obviously soft metal or plastic could also be provided in the grooves 67 between rings 64, if desired.

In this form rings 63 and 64 have been shown with their outer surfaces substantially cylindrical and their inner surfaces substantially frusto-conical about the axis of the valve body 11.

It will be apparent that the unique valve seat and valve disk of the present invention may be incorporated in any configuration of valve such as a two-way, three-way, or check valve, a safety valve, or any other particular arrangement which could utilize the particular seating arrangement of the present invention. These valves may be made in any size and design for any pressure or temperature of operation, and particularly when made of a metal such as stainless steel, it will not deteriorate over a long period of time.

While the invention has been illustrated in conjunction with a manually operated valve, it will be apparent that it could also be utilized with hydraulically, pneumatically or solenoid actuated valves of conventional construction.

The improved valve seating arrangement of the present invention may be utilized for all types of fluid, such as gas, corrosive liquids, slurry, or liquid metals, and is particularly useful where extremely high or low temperatures are required, such as in heat sterilization and hospital equipment, and drug and food products.

Obviously, many other modifications and variations of the present invention may be made within the scope of the following claims.

What is claimed is:
1. A valve seat and a valve disk for use in a flow control valve;

said valve seat and said valve disk being provided with complementary, inter-spaced, concentric annular rings;
said annular rings being thin and resilient, the rings on the disc and seat being so constructed and arranged that when the disc and seat are moved together the ends of at least some of the rings on the disc contact the sides of complementary rings on the seat and the ends of at least some of the rings on the seat contact the sides of complementary rings on the disc to provide a self adjusting contact of their outer edges with the sides of the complementary rings.

2. A valve seat and a valve disk for use in a flow control valve;
said valve seat and said valve disk being provided with complementary, inter-spaced, concentric annular rings;
said annular rings being thin, tapered and resilient, the rings on the disc and seat being so constructed and arranged that when the disc and seat are moved together the ends of at least some of the rings on the disc contact the sides of complementary rings on the seat and the ends of at least some of the rings on the seat contact the sides of complementary rings on the disc to provide a self adjusting contact of their outer edges with the sides of the complementary rings and a self-cleaning and lapping action as said rings engage each other.

3. A valve seat and a valve disk for use in a flow control valve;
said valve seat being provided with a plurality of concentric annular rings;
said valve disk being provided with a plurality of complementary, inter-spaced, annular rings;
said annular rings being thin and resilient, the rings on the disc and seat being so constructed and arranged that when the disc and seat are moved together the ends of at least some of the rings on the disc contact the sides of complementary rings on the seat and the ends of at least some of the rings on the seat contact the sides of complementary rings on the disc to provide a self adjusting contact of their outer edges with the sides of the complementary rings and a self cleaning and lapping action as said rings engage each other.

4. In a valve having a valve body with an inlet port and an outlet port, and a valve stem moveable axially within said valve body, the improvement comprising:
(A) a valve seat mounted in said valve body and surrounding one of said ports;
(B) and a valve disk mounted on said valve stem for movement towards and away from said valve seat;
(C) said valve seat and said valve disk each having complementary thin annular blades concentrically arranged with respect to said axis and inter-spaced with respect to each other, the blades on the disc and seat being so constructed and arranged that when the disc and seat are moved together the ends of at least some of the blades on the disc contact the sides of complementary blades on the seat and the ends of at least some of the blades on the seat contact the sides of complementary blades on the disc, certain of said blades having their peripheral outer edges in resilient contact with the adjacent sides of the complementary blades.

5. In a valve having a valve body with an inlet port and an outlet port and a valve stem moveable axially within said valve body, the improvement comprising:
(A) a valve seat mounted in said body and surrounding one of said ports;
(B) and a valve disk mounted on said valve stem for movement towards and away from said valve seat;
(C) said valve seat and said valve disk each having complementary annular blades concentrically arranged with respect to said axis and inter-spaced with respect to each other, the blades on the disc and seat being so constructed and arranged that when the disc and seat are moved together the ends of at least some of the blades on the disc contact the sides of complementary blades on the seat and the ends of at least some of the blades on the seat contact the sides of complementary blades on the disc,
said concentric annular blades being substantially frusto-conical in configuration and being tapered outwardly to provide thin resilient blades which may be forced into tight sealing engagement.

References Cited by the Examiner

UNITED STATES PATENTS

| 676,580 | 6/01 | French | 251—334 |
| 933,863 | 9/09 | Thompson | 251—333 |
| 1,342,955 | 6/20 | Gebhardt | 251—333 |
| 1,679,779 | 8/28 | Oberhuber | 251—330 |

FOREIGN PATENTS

| 22,696 | 1898 | Great Britain. |
| 755,130 | 8/56 | Great Britain. |

WILLIAM F. O'DEA, *Primary Examiner.*

ISADOR WEIL, *Examiner.*